May 8, 1923.
W. W. MacDONALD
HYDRAULIC BRAKE
Filed Nov. 19, 1920
1,454,397
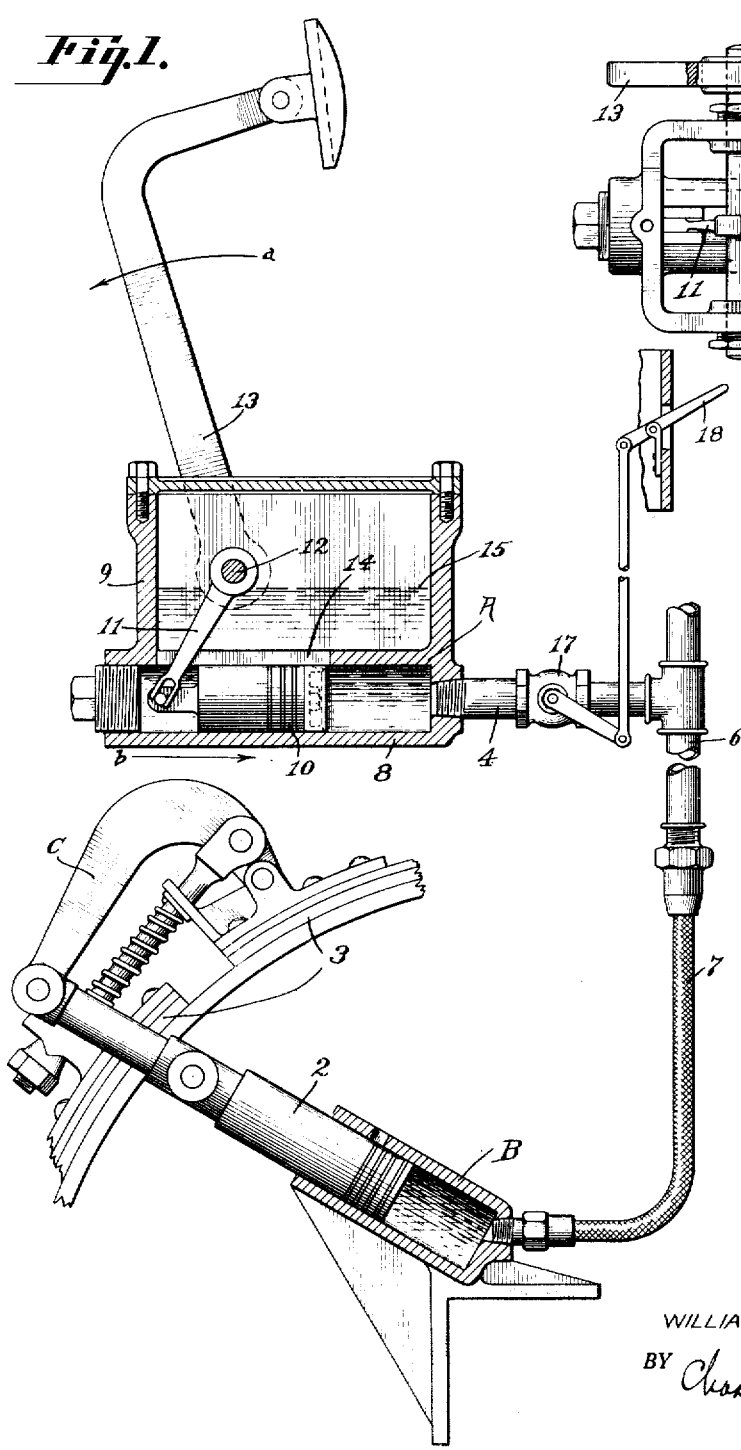
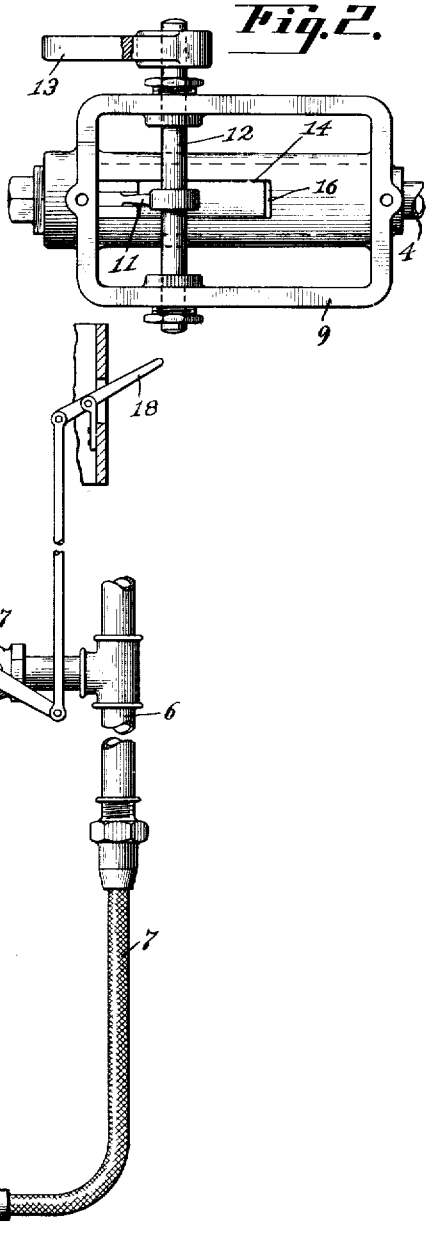
INVENTOR.
WILLIAM W. MacDONALD
BY Chas. E. Townsend
ATTORNEY Patented May 8, 1923.

UNITED STATES PATENT OFFICE.

WILLIAM W. MacDONALD, OF SAN FRANCISCO, CALIFORNIA.

HYDRAULIC BRAKE.

Application filed November 19, 1920. Serial No. 425,061.

*To all whom it may concern:*

Be it known that I, WILLIAM W. MACDONALD, a citizen of the United States, residing at the city and county of San Francisco and State of California, have invented a new and useful Improvement in Hydraulic Brakes, of which the following is a specification.

This invention relates to a hydraulic braking mechanism for motor vehicles and the like wherein the brake bands are actuated by hydraulic cylinders, and espcially to provide a simple actuating ram for delivering a liquid under pressure to said cylinders.

In the operation of hydraulic transmissions, hydraulic brakes, rams and like devices, considerable trouble is caused by leakage losses of the liquid employed and by air entering and mixing with the liquid, etc.

One of the objects of the present invention is to provide a simple, substantial and easily operated hydraudic ram and a series of brake cylinders actuated thereby, which are so arranged that automatic priming thereof will be permitted, leakage losses reduced to a minimum, and air accumulations or emulsification of the liquid employed prevented.

Another object of the invention is to provide a ram for the actuation of the brake cylinders, which ram will impose a uniform pressure on each cylinder and which itself will be automatically primed and vented during operation.

Another object of the invention is to provide an actuating ram in which stuffing boxes may be entirely eliminated and which may be operated with a minimum of effort.

Another object of the invention is to provide a valve adapted to cooperate with the actuating ram and so interposed between the ram and the brake cylinders that the fluid under pressure in said cylinders may be locked when the brakes are set.

Further objects will hereinafter appear.

The invention consists of the parts and the construction, combination and arrangement of parts as hereinafter more fully described and claimed, having reference to the accompanying drawings, in which—

Fig. 1 is a diagrammatic side elevation partially in section showing the connection between the actuating ram and the brake cylinders.

Fig. 2 is a detail plan view of the actuating ram.

Referring to the drawings in detail, A indicates a hydraulic ram and B a brake cylinder actuated thereby. This cylinder contains a plunger or piston 2 which is connected with a brake band 3, by a link mechanism generally indicated at C. The brake cylinder B is connected with the ram by means of a pipe 4, branch pipe 6 and a flexible pipe connection 7. The brake cylinder B, the pipe connections employed and the specific connection between the piston 2 and the brake band 3 forms no part of the invention and is merely illustrated and described to show the function of the hydraulic ram which forms the real subject matter of the present application.

The hydraulic ram consists of a cylinder 8 cast integral with and formed in the bottom of an oil reservoir tank 9. This tank is preferably placed beneath the floor board of a motor vehicle, or at any other point within convenient reach of the driver. The cylinder proper carries a piston 10 to which reciprocal movement is imparted through a crank 11 secured on a shaft 12, extending crosswise of the reservoir and journalled therein. This shaft is in turn actuated by a foot lever 13 secured on the exterior end of the shaft. The cylinder is slotted on the upper side as at 14 to form a combined priming and venting passage between the cylinder and the reservoir. The reservoir normally contains oil which is maintained at the level shown at 15. The cylinder 8, the cylinder B and the pipe connections 4, 6 and 7, are also filled with oil and any movement transmitted to the piston 10 will therefore transmit movement to the plunger 2.

In actual operation we will assume that the brake pedal 13 is depressed in the direction of arrow *a*. Such movement will transmit a turning movement to the shaft 12 and the crank 11, and will in turn cause the piston 10 to move forward in the cylinder 8 in the direction of arrow *b*. Such movement will place the oil in the pipe connections under pressure and force it through the same into the cylinder B, thereby moving the plunger 2 outwardly to such an extent that the brakes will become set; the amount of pressure exerted upon the brake being entirely dependent upon the foot pressure exerted upon the pedal 13. In actual operation of devices of this character it is found that oil or other liquids employed have a tendency to become emulsified, that is more or less air accumulates in the pipe connections and in the cylinders and also mixes with the oil, thus producing a cushioning effect and lost motion which is anything but desirable. It is also found that considerable leakage takes place and that unless repriming of the several connection is resorted to at frequent intervals, reliable operation cannot be depended upon. The present invention has been designed in such a manner that the objections referred to will not occur. First, because the system as a whole is automatically vented, and secondly because both the cylinder B, the pipe connections and the ram cylinder 8, are automatically primed whenever the brakes are released. The venting and priming is accomplished by building the oil reservoir exterior of, or integral with the cylinder 8 and by forming the slot 14 in the upper side of the cylinder, that is whenever the foot pedal 13 is released, it will assume the position shown in Fig. 1. The piston 10 will then have moved rearwardly in the cylinder 8 such a distance that a portion of the slot 14 will be uncovered as at 16, see Fig. 2. Direct communication is formed between the reservoir and the cylinder 8 and as the connecting pipes are directly attached to the cylinder, it is obvious that any air contained in the pipe line will have a tendency to rise upwardly and escape, similarly if oil should have escaped or leaked from any of the pipe connections or connected brake cylinders, oil will have a chance to flow through the openings 16 into the cylinder 8 and reprime the same. The cylinder 8 and all the mechanism connected therewith is thus automatically vented and primed whenever the brakes are returned to released position as the piston 10 will automatically uncover a part of the slot 14 and thereby permit a free escape of air, and similarly a free inflow of oil from the reservoir to reprime the line whenever required.

Another important feature obtained by slotting the upper side of the cylinders at 14 is the elimination of any stuffing box as far as the main actuating ram or piston 10 through means of the crank arm 11. No leakage can take place at this point, and if any oil should escape around the plunger or piston 10, it would only be returned to the oil reservoir. In fact the only chance for leakage would be around the plunger 2, but if this is well packed it should be obvious that such loss will be very small.

Another important feature of the present invention is the employment of a valve 17. This valve is placed on the pipe 4 and may open or close communication between the ram cylinder and the brake cylinder. For instance when travelling down long hills in a mountainous country, it sometimes becomes rather tiresome to exert constant foot pressure on the brake pedal. This may be avoided when riding down a long hill by employing the valve 17, that is the foot pedal is depressed and a downward pressure exerted upon the brake. The valve 17 may then be closed and this will retain the oil under pressure on the line, thus permitting the operator to release his foot and rest. The valve 17 is manually opened or closed by means of a link and lever 18 placed within convenient reach.

Another important feature is the fact that one actuating ram is employed whether one, two or more, brake cylinders are used. Due to this arrangement it should be obvious that an even and uniform pressure will be exerted on each brake and that all tendency of overloading one brake or another is avoided.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. In a device of the character described a hydraulic actuating ram, said ram comprising a cylinder, a liquid containing reservoir, a slot formed in the upper side of the cylinder in communication with the reservoir, a piston in the cylinder adapted to cover and uncover the slot, and means projecting through the slot and engageable with the piston to impart a reciprocal movement thereto.

2. In a device of the character described a hydraulic actuating ram, said ram comprising a cylinder, a liquid containing reservoir, a slot formed in the upper side of the cylinder in communication with the reservoir, a piston in the cylinder adapted to cover and uncover the slot, a shaft extending crosswise of the reservoir and journalled therein, a crank arm secured on the shaft and projecting through the slot, said crank arm being connected with the piston to impart a reciprocal movement thereto, and means for imparting a turning movement to the shaft.

3. In a device of the character described a liquid containing reservoir, a cylinder formed in the bottom of said reservoir, a slot formed in the upper part of the cylinder forming a communication between the reservoir and the cylinder, a piston in the cylinder, a shaft extending crosswise of the reservoir and journalled therein, a crank arm secured on the shaft projecting through the slot into the cylinder, a connection between the crank arm and the piston to impart a reciprocal movement thereto, and a lever secured to the shaft for imparting an oscillating movement thereto.

4. In a device of the character described a hydraulic actuating ram comprising a cylinder, a piston reciprocally mounted in the cylinder, a liquid containing reservoir, a slot formed in the cylinder in communication with the reservoir, and means extending through the slot and connected with the piston to impart reciprocal movement thereto.

5. In a device of the character described a hydraulic actuating ram, said ram comprising a cylinder, a liquid containing reservoir disposed above the cylinder, a slot formed in the upper side of the cylinder in communication with the reservoir, a piston in the cylinder adapted during reciprocal movement to cover and uncover the slot, and an arm pivotally mounted in the reservoir and extending downwardly through the slot, said arm being connected with the piston to impart a reciprocal movement thereto.

In testimony whereof I have hereunto set my hand in the presence of two subscribing witnesses.

WILLIAM W. MacDONALD.

Witnesses:
W. W. HEALEY,
C. M. ATHERTON.

DISCLAIMER

1,454,397.—*William W. MacDonald*, San Francisco, Calif. HYDRAULIC BRAKE. Patent dated May 8, 1923. Disclaimer filed May 25, 1932, by the *patentee*.

Hereby disclaims from each and all claims 1 to 5, inclusive, of said patent any device except when the device is connected and combined with, and adapted and arranged for remote operation of, a plurality of hydraulic brakes and brake setting mechanisms and in which the connections between the brake setting mechanisms and cylinder 8 and between the latter and the reservoir permit automatic venting and priming whenever the brakes are returned to released position, and in which device the reciprocating means for the piston include a brake pedal.

[*Official Gazette June 14, 1932.*]